(12) United States Patent
Master et al.

(10) Patent No.: US 12,406,658 B2
(45) Date of Patent: Sep. 2, 2025

(54) METHOD AND APPARATUS COMBINING SEPARATION AND CLASSIFICATION OF AUDIO SIGNALS

(71) Applicants: Dolby Laboratories Licensing Corporation, San Francisco, CA (US); DOLBY INTERNATIONAL AB, Dublin (IE)

(72) Inventors: Aaron Steven Master, San Francisco, CA (US); Lie Lu, Dublin, CA (US); Heidi-Maria Lehtonen, Upplands Väsby (SE)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 146 days.

(21) Appl. No.: 17/921,564

(22) PCT Filed: May 3, 2021

(86) PCT No.: PCT/US2021/030506
§ 371 (c)(1),
(2) Date: Oct. 26, 2022

(87) PCT Pub. No.: WO2021/225978
PCT Pub. Date: Nov. 11, 2021

(65) Prior Publication Data
US 2023/0215423 A1 Jul. 6, 2023

Related U.S. Application Data

(60) Provisional application No. 63/019,597, filed on May 4, 2020.

(30) Foreign Application Priority Data

May 4, 2020 (EP) .................................... 20172644

(51) Int. Cl.
*G10L 21/0272* (2013.01)
*G10L 15/08* (2006.01)
(Continued)

(52) U.S. Cl.
CPC .......... *G10L 15/08* (2013.01); *G10L 21/0272* (2013.01); *G06F 3/165* (2013.01); *G10L 25/24* (2013.01)

(58) Field of Classification Search
CPC ...... G10L 21/0272; G10L 25/24; G06F 3/165
See application file for complete search history.

(56) References Cited

U.S. PATENT DOCUMENTS 10,049,678 B2 8/2018 Nesta
10,595,144 B2 * 3/2020 Cardinaux .......... G10L 21/0272
(Continued)

FOREIGN PATENT DOCUMENTS

CN 108538311 B * 9/2020 ............. G10L 25/24
WO 2015150066 A1 10/2015
(Continued)

OTHER PUBLICATIONS

Tzinis, et al., "Improving Universal Sound Separation Using Sound Classification," ICASSP 2020 (IEEE Explore Apr. 9, 2020). (Year: 2020).*

(Continued)

*Primary Examiner* — Feng-Tzer Tzeng

(57) ABSTRACT

Computer-implemented methods and devices for combined audio separation and classification are provided. An estimated separated signal is time gated based on a determination of an audio classifier of, at least in part, the original mix of signals before separation. Combined separation, classification, and time gating of both the estimated signal and a residual signal are also provided.

15 Claims, 8 Drawing Sheets

(51) Int. Cl.
    *G06F 3/16*     (2006.01)
    *G10L 25/24*     (2013.01)

(56) References Cited

U.S. PATENT DOCUMENTS

| | | | |
|---|---|---|---|
| 2007/0083365 A1 | 4/2007 | Shmunk | |
| 2012/0308049 A1 | 12/2012 | Schreiner | |
| 2016/0037279 A1 | 2/2016 | Borne | |
| 2017/0127212 A1 | 5/2017 | Jot | |
| 2019/0034157 A1* | 1/2019 | Steinberg | G06F 3/165 |
| 2019/0037331 A1 | 1/2019 | Samuelsson | |
| 2019/0222951 A1 | 7/2019 | Seefeldt | |

FOREIGN PATENT DOCUMENTS

| | | |
|---|---|---|
| WO | 2017035281 A2 | 3/2017 |
| WO | 2021252795 | 12/2021 |
| WO | 2021252823 | 12/2021 |
| WO | 2021252912 | 12/2021 |

OTHER PUBLICATIONS

Tzinis, et al., "Improving Universal Sound Separation Using Sound Classification," IEEE ICASSP 2020—IEEE Explore Apr. 9, 2020 (see attached reference in the previous Office action). (Year: 2020).*

Tzinis, et al., "Improving Universal Sound Separation Using Sound Classification," ICASSP 2020—IEEE Explore Apr. 9, 2020.—see attached reference in the previous Office action. (Year: 2020).*

Lee, J. "An 8.3mW 1.6Msamples/s Multi-modal Event-driven Speech Enhancement Processor for Robust Speech Recognition in Smart Glasses" IEEE, p. 117-120, Sep. 2016.

Tang, Y. et al "Automatic Speech-to-Background Ratio Selection to Maintain Speech Intelligibility in Broadcasts Using an Objective Intelligibility Metric" Applied Sciences, 2018, pp. 1-20.

* cited by examiner

METHOD AND APPARATUS COMBINING SEPARATION AND CLASSIFICATION OF AUDIO SIGNALS

CROSS-REFERENCES TO RELATED APPLICATIONS

This application is a U.S. National Stage application under U.S.C. 371 of International Application No. PCT/US2021/030506, filed 3 May 2021, which claims priority of the following priority applications: U.S. provisional application 63/019,597, filed 4 May 2020, and EP application 20172644.5, filed 4 May 2020, each of which are hereby incorporated by reference.

FIELD

The present disclosure relates to the processing of audio signals. In particular, it relates to method and apparatus combining separation and classification of audio signals.

BACKGROUND

Source separation is the extraction of a target source (for example, movie dialog) from a mixture (e.g., a mixed movie including dialog, music and effects). Source separation is relevant, for example, in cases in which estimated dialog is, or could be, extracted and then added back in to an original audio mix to form a "dialog boosted" signal.

Source separation systems often involve both (1) extracting a source and (2) identifying that the extracted source represents the "type of source" desired. Sometimes, a source separation system is trained to extract only a particular type of source, such as dialog; in such cases identifying the "type of source" may be unnecessary. Other times, a source separation system extracts a "generic" source based on some criteria, without knowing what type of source it has extracted; in such cases it is often beneficial (or necessary) to also determine that the extracted source is in fact of the type desired.

SUMMARY

The present disclosure describes methods and devices for combining separation and classification of audio signals.

According to a first aspect, a computer-implemented audio separation and classification method is described, comprising: performing source separation on a mixture of audio signals to obtain at least one estimated separated audio signal indicative of a target audio source or sources; performing audio classification on, at least in part, the mixture of audio signals to obtain a determination whether the mixture of audio signals contains the target audio source or sources; and time gating the separated audio signal based on at least the determination.

According to a second aspect, a computer-implemented audio separation and classification method is described, comprising: performing source separation on a mixture of audio signals to obtain at least one estimated separated audio signal indicative of a target audio source or sources; subtracting the estimated separated audio signal from the mixture of audio signals to obtain a residual audio signal; performing audio classification on the estimated separated audio signal to obtain a signal determination whether the estimated separated audio signal contains the target audio source or sources; performing audio classification on the residual audio signal to obtain a residual determination whether the residual audio signal contains the target audio source or sources; time gating the separated audio signal based on the signal determination to obtain a time gated estimated separated audio signal; time gating the residual audio signal based on the residual determination to obtain a time gated residual audio signal; and combining the time gated residual audio signal with the time gated estimated separated audio signal.

According to a third aspect, an apparatus for audio separation and classification is described, comprising: a source separator, configured to separate a mixture of audio signals to obtain an estimated separated audio signal indicative of a target audio source or sources; an audio classifier, configured to perform classification on, at least in part, the mixture of audio signals to obtain a determination whether the mixture of audio signals contains the target audio source or sources; and a gating device, configured to time gate the separated audio signal based on at least the determination.

According to a fourth aspect, an apparatus for audio separation and classification is described, comprising: a source separator, configured to separate a mixture of audio signals to obtain an estimated separated audio signal indicative of a target audio source or sources; a subtractor, configured to subtract the estimated separated audio signal from the mixture of audio signals to obtain a residual audio signal; a signal audio classifier, configured to perform audio classification on the estimated separated audio signal to obtain a signal determination whether the estimated separated audio signal contains the target audio source or sources; a residual audio classifier, configured to perform audio classification on the residual audio signal to obtain a residual determination whether the residual audio signal contains the target audio source or sources; a signal gating device, configured to time gate the separated audio signal based on the signal determination to provide a time gated estimated separated audio signal; a residual gating device, configured to time gate the residual audio signal based on the residual determination to provide a time gated residual audio signal; and a combiner, configured to combine the time gated residual audio signal with the time gated estimated separated audio signal.

Further aspect of the present disclosure will be apparent to the person skilled in the art upon the reading of the description and drawings of the present application.

DESCRIPTION OF EXAMPLE EMBODIMENTS

Figure 1:
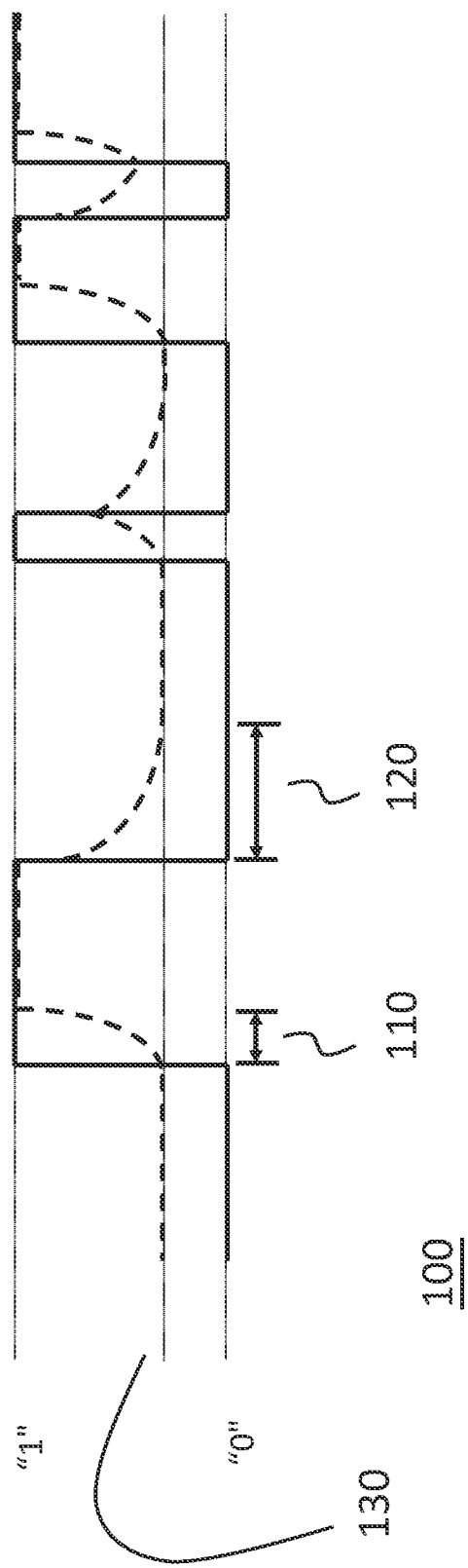
FIG. 1 shows an example of time gating waveforms.

The present disclosure is directed to certain implementations for the purposes of describing some innovative aspects described herein, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module", a "device", an "apparatus" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

There are applications of source separation where an original estimate of an extracted source is insufficient, and the estimate must be further qualified as a precise type of source that is being sought. An example of such a "type of source" is speech. Some source separation systems might be able to extract a target source which is hopefully speech, but not known to be speech. In such case, it is desirable (or required) to further qualify that the source estimate is speech by performing classification. This is especially wise to do if the separator and classifier at disposal each perform well at their goals, but do not meet the other component's goal. The optimal combination of such system components can and will lead to superior quality output.

A way to run such a "separation plus classification" system is through the following steps: (1) extract a candidate source or sources (2) classify the candidate source or sources (3) output only the qualifying sources. While this approach can work very well, it may not be optimal in all cases, due to the latency, computation, and memory required.

Throughout the present disclosure, terms such as source separation, classification, qualification, gating, and soft gating will be adopted. These terms will now be defined in the following paragraphs.

"Source separation" generally describes the task of extracting or isolating a particular "target source" signal from a mixture of signals. The other signals are typically referred to as "interferers," "interference," "noise," or "backgrounds." Examples include extraction of a voice from background noise, isolating a guitar solo from a full musical ensemble, or separating an unknown source based on its physical location in space. The terms "extraction" "separation" and "source separation" will be used interchangeably throughout the present disclosure.

Some source separation systems are built to extract sources of a particular type, for example speech. Other systems may extract sources whose type is not known. According to some embodiments of the present disclosure, the methods and apparatus described herein may be relevant when the source separator is significantly less than certain to have estimated a signal only of the desired type.

Source separation systems can aim to extract a single source or more than one source, or to suppress one or more sources. They may also operate under particular restrictions such as only extracting sources which exist within a particular frequency subband, e.g. 800-1600 Hz.

The term "classification" refers to a determination that an input signal belongs to a particular class or classes. In the present context, classification is generally assumed to be performed algorithmically by a "classifier" using techniques familiar to those skilled in the art.

The term "qualified" indicates when a source has been judged by the "qualification" or "classification" process to belong to a desired class, for example speech. That is, a signal which achieves an affirmative classification result shall be termed "qualified." While classifiers may output confidence levels or values other rather than binary decisions, it will be assumed throughout the present disclosure, without intention to lose generality, that all outputs have been converted to a binary "qualified" (yes) or "unqualified" (no) value for each unit in time. Such conversion may be performed using any technique familiar to those skilled in the art, including simple thresholding or thresholding with hysteresis.

"Gating" refers to reducing (e.g. "turning off") or "turning on" a signal based on some condition. One typical way this is done is by multiplying the signal by 0 or 1 depending on the condition being met. The present disclosure will consider methods and devices that gate a signal based on its qualifying status, with the term "qualified" defined as above. Such gating will be performed as a function of time (i.e. there are times when the signal is multiplied by 0 and times where the signal is multiplied by 1) and will be referred to as "time gating".

According to several embodiments of the present disclosure, a specific kind of gating, called "soft gating," will be described. The function of a soft gating operation is similar to gating, except that at least the "off" or 0 condition is replaced by a reduced-from-1 but nonzero value, that there are transition regions specified between the "on" and "reduced" conditions, or both. The soft gating function takes on values other than 0 and 1. It should be noted that the soft gating parameters could be set such that the gating function is 0 or 1 only. In other words, the use of soft gating is intended to add flexibility as a specific kind of time gating, not to limit the scope of the present disclosure.

Relevant parameters for soft gating are unqualified source passthrough, ramptime up, ramptime down, which will be defined as follows.

The term "unqualified source passthrough" represents the amount of the source separation system's output passed through to the overall system output when the classifier indicates the source is not qualified. In certain applications, higher levels lead to less pumping, and lower levels lead to cleaner output when the classifier says "no." A range to be possibly used throughout the present disclosure is −6 to −26 dB (that is, a scale factor of approximately 0.50 to 0.05) though other levels including −100 dB or less, including the extreme case of −infinity dB (scale factor of 0.0) are possible. The qualified source passthrough level shall be assumed to be unity (1.0) which may also be expressed as 0.0 dB.

The term "ramptime up" represents the time, in seconds, to go from the unqualified source passthrough level up to the qualified passthrough level (full magnitude). A value of 0.1 sec or less will be assumed, though other values may be used throughout the present disclosure. Choice of a relatively short ramptime up allows the system to be causal. That is, when the classifier triggers "yes" (qualified), ramping of the soft gating function shall begin, and it shall end the specified amount of time later, achieving full passthrough. While a causal system can be used in cases where reduction of latency is desired, noncausal systems with lookahead may also be used for application of the teachings of the present disclosure. This choice also depends on the response time of a given classifier; classifiers which lag may require lookahead when soft gating is applied. While in several cases a ramping up function that progresses linearly vs time on a dB scale can be adopted, other curves may be used as well.

The term "ramptime down" represents the time, in seconds, to go from full magnitude down to the unqualified source passthrough level. A value of 1.0 sec or less will be assumed, though other values may be used. As with ramptime up, ramptime down can be applied in a causal way. When the classifier says "no" (unqualified) the ramping down shall begin, and it shall end at the specified duration of time, with the soft gating function having gone fully down to the unqualified source passthrough level. Again, the causality may need to be adjusted if the classifier deactivates early or late. Also in this case a ramping down function that progresses linearly vs time on a dB scale can be adopted, though other curves may be used as well.

FIG. 1 depicts an example of time gating waveforms (100) in accordance with the present disclosure where 0/1 gating (solid lines) and soft gating (broken lines) are described. For purposes of this example, the "0 or 1" gating function shown in solid lines is also assumed to represent the binarized confidence level output of a classifier, to be later described in detail.

The system of FIG. 1 operates in a causal mode, meaning that ramping does not begin until the moment in time at which the classifier indicates a change of state.

The ramping functions appear curved. This is because the ramping is assumed to be linear vs time on a dB scale in the current embodiment, which causes a curved appearance on a linear vertical scale as is used in FIG. 1.

FIG. 1 also shows how the soft gating system performs when the ramptime up value (110) or ramptime down value (120) exceeds the time that the classifier spends in the respective "yes" or "no" destination state: the soft gating ramp function shall continue as specified until either the specified destination value (either "1" or the unqualified source passthrough level indicated with numeral (130)) is met, or until a new destination value is specified by the classifier, in which case the ramp function changes direction. This process continues indefinitely as necessary.

Figure 2:
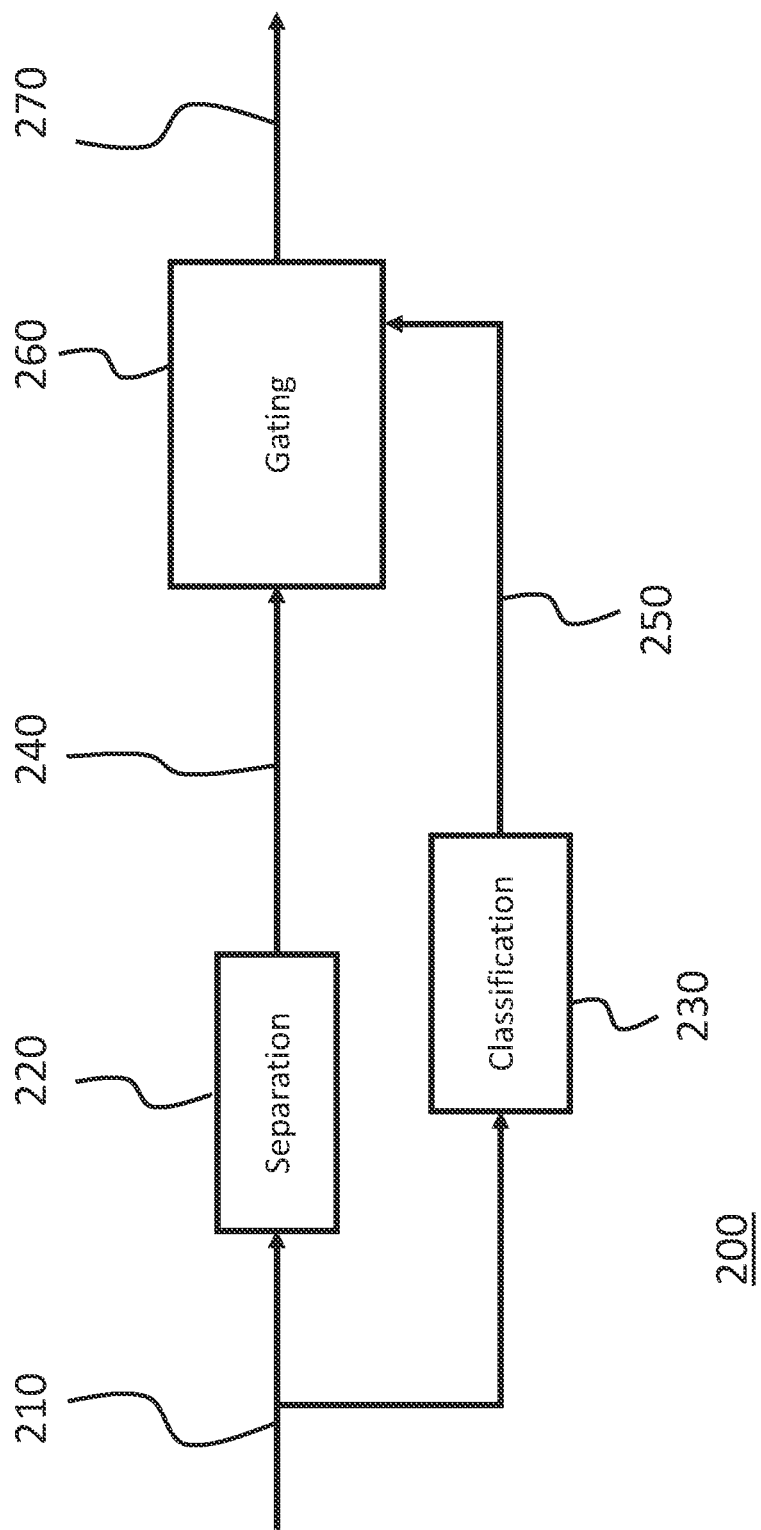
FIG. 2 shows a separation and classification system where classification is performed on the original audio mix.

FIG. 2 shows a system (200) according to an embodiment of the present disclosure where both source separation (220) and classification (230) are performed. Source separation (220) is performed on a mixture of audio signals (210), and so is classification (230). The separation (220) outputs an estimated separated audio signal (240) indicative of a target audio source or sum of sources.

Given that classification (230) is not performed on the audio signal (240), classification (230) may occur before separation (220) ("classification first") or may occur simultaneously with separation (230) ("classification and separation in parallel"). Parallel processing requires less latency. While parallel operation will be assumed throughout the figures, the person skilled in the art will understand that the teachings of the present disclosure also apply to "classification first" cases. Further, it will be assumed without loss of generality, that only one target source is extracted, or that multiple target sources are extracted and then summed to form a single target source signal.

The output (250) of classifier (230) may provide a determination (e.g. a confidence level) that the mixture of audio signals (210) contains the target audio source, or a binary judgment that this is or is not the case. The classification result, which can be expressed, for example, as a value from 0 to 1 per unit time, is used to gate (e.g. soft gate) (260) the output (240) of the separator (220) in accordance with the teachings of previously described FIG. 1 to produce an audio signal (270) indicative of an estimated separated and qualified audio source. In the example implementation as shown in FIG. 2, as well in various implementations described in reference to other figures, classification performed by the classifier (230) can be independent from the separation performed by the separator (220). Accordingly, results of the classification do not influence the separator (220). Such independence of classification and separation improves usability of the system over conventional technologies, for example, by lowering latency and complexity.

With continued reference to FIG. 2 and in accordance with a further embodiment of the disclosure, separator (220) can be tuned, to reduce the risk of extracting sound other than a qualified source. For example, if the target source has a known attribute such as being panned, the separator (220) can be tuned for extraction of panned sources only.

The system shown in FIG. 2 is relatively inexpensive, requiring only one separator and one classifier. It is fast, since it can run classification and separation simultaneously, reducing latency. One specific example where such system is useful is low latency dialog enhancement for entertainment content. In such content, the encoder configured to include the system has very limited lookahead, but the target source (dialog) has known attributes than can reduce the risk posed by using classification (230) of the mix (210) to gate the signal (240) out of the separator (220).

FIGS. 3-6 describe further embodiments of the present disclosure. The following description of such further embodiments will focus on the differences between such embodiments and the embodiment previously described with reference to FIG. 2. Therefore, features that are common to one of the embodiments of FIGS. 3-6 and the embodiment of FIG. 2 can be omitted from the following description. If so, it should be assumed that features of the embodiment of FIG. 2 are or at least can be implemented in the further embodiments of FIGS. 3-6, unless the following description thereof requires otherwise.

Figure 3:
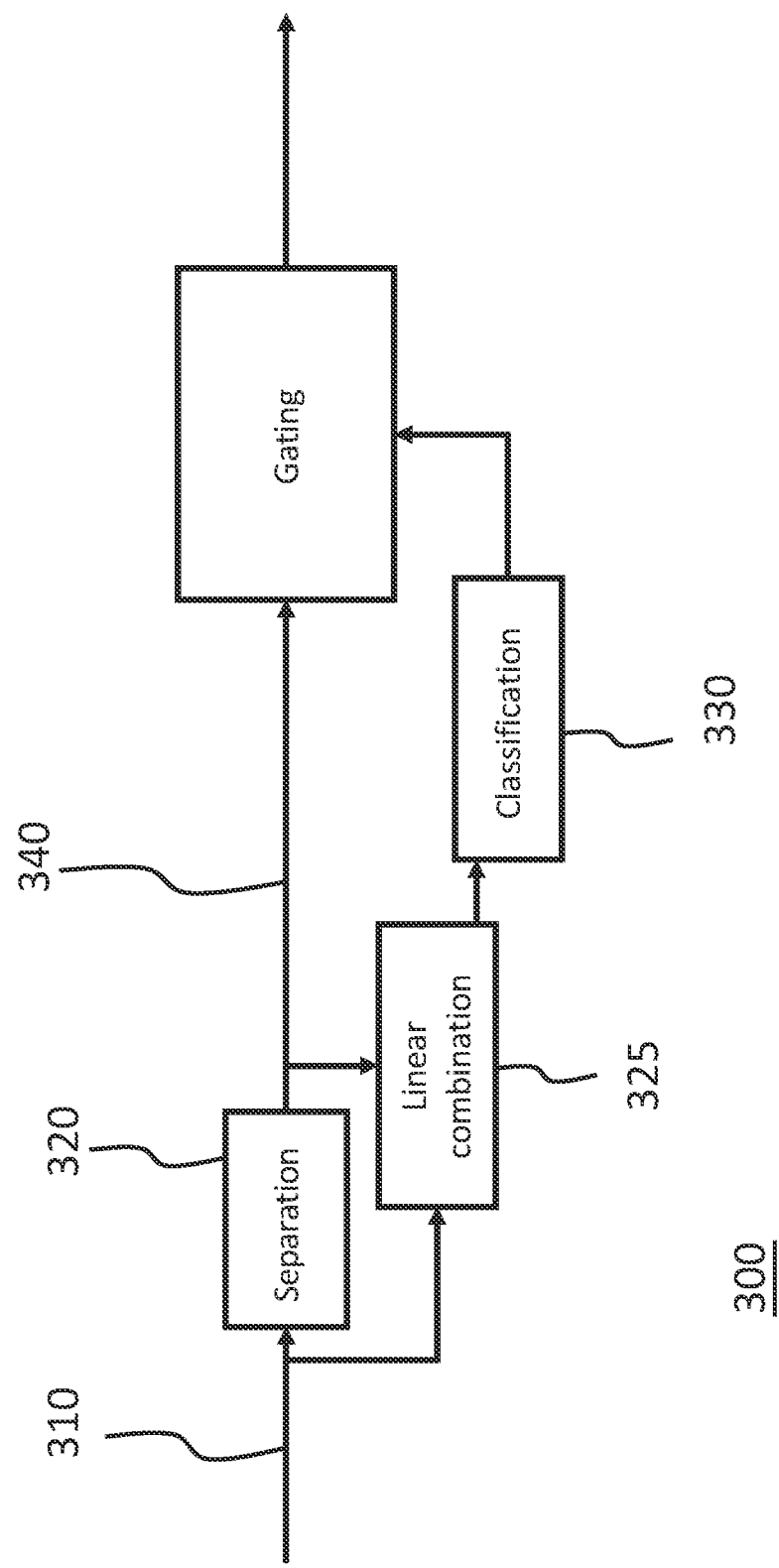
FIG. 3 shows a separation and classification system where classification is performed on a linear combination of the original audio mix and the separator output.

FIG. 3 shows a system (300) in which classifier (330) operates on a linear combination (325) of the original input mix (310) and the output (340) of the separator (320). Such embodiment further mitigates the challenge posed by introduction of the separator's potential errors. By way of example, such embodiment can allow an original trained classifier (330) to be used without retraining.

Figure 4:
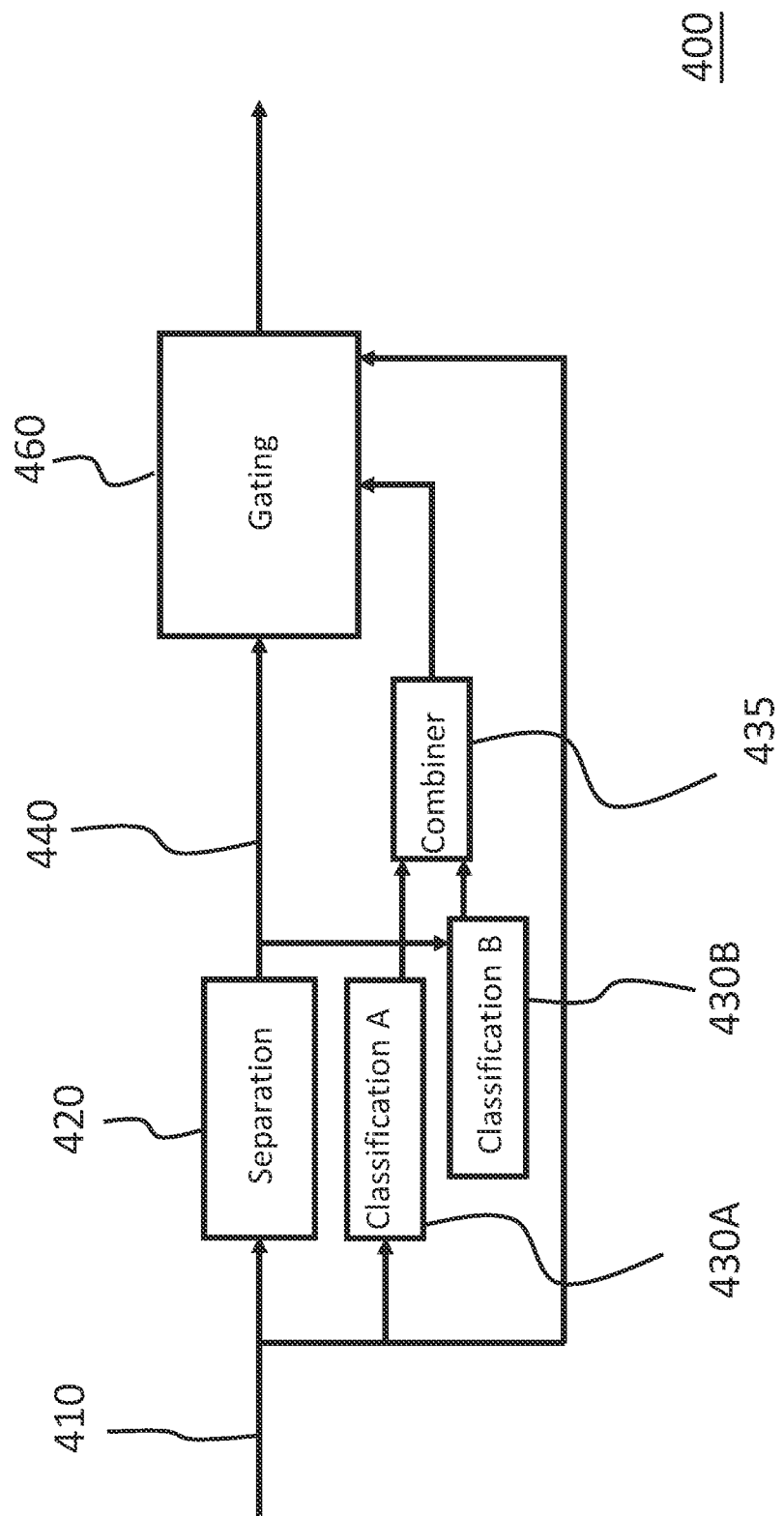
FIG. 4 shows a separation and classification system using two classifiers.

FIG. 4 shows a system (400) using two classifiers: a first classifier (430A) operates on the original mix (410) and a second classifier (430B) operates on the output (440) of the separator (420). A combiner (435) then considers whether to go with the decision of the first classifier (430A) or the second classifier (430B). Specifically, if the separator (420) errs and eliminates the target source, the second classifier (430B) will (ideally) say "no" and the first classifier (430A) will say "yes," as a consequence of which the combiner (435) will perform a mitigation strategy, such as just passing through the original input (410) instead of the output (440) of the separator (420). In all other cases, the system operates as already described in FIGS. 2 and 3: the output of the second classifier (430B) dictates how the separator's output (440) shall be gated (460), e.g. soft gated. Although the presence of the extra classifier incurs additional processing cost, the person skilled in the art will understand that the embodiment of FIG. 4 is useful to mitigate cases where the separator fails.

The approaches shown in FIGS. 2-4 above have all assumed the presence of a single target source (or sum of such sources) but do not explicitly consider the residual signal—what is left behind of the original mix after the target is subtracted from it. However, there is a risk that the separator will extract something other than the target source and leave the target source behind.

Figure 5:
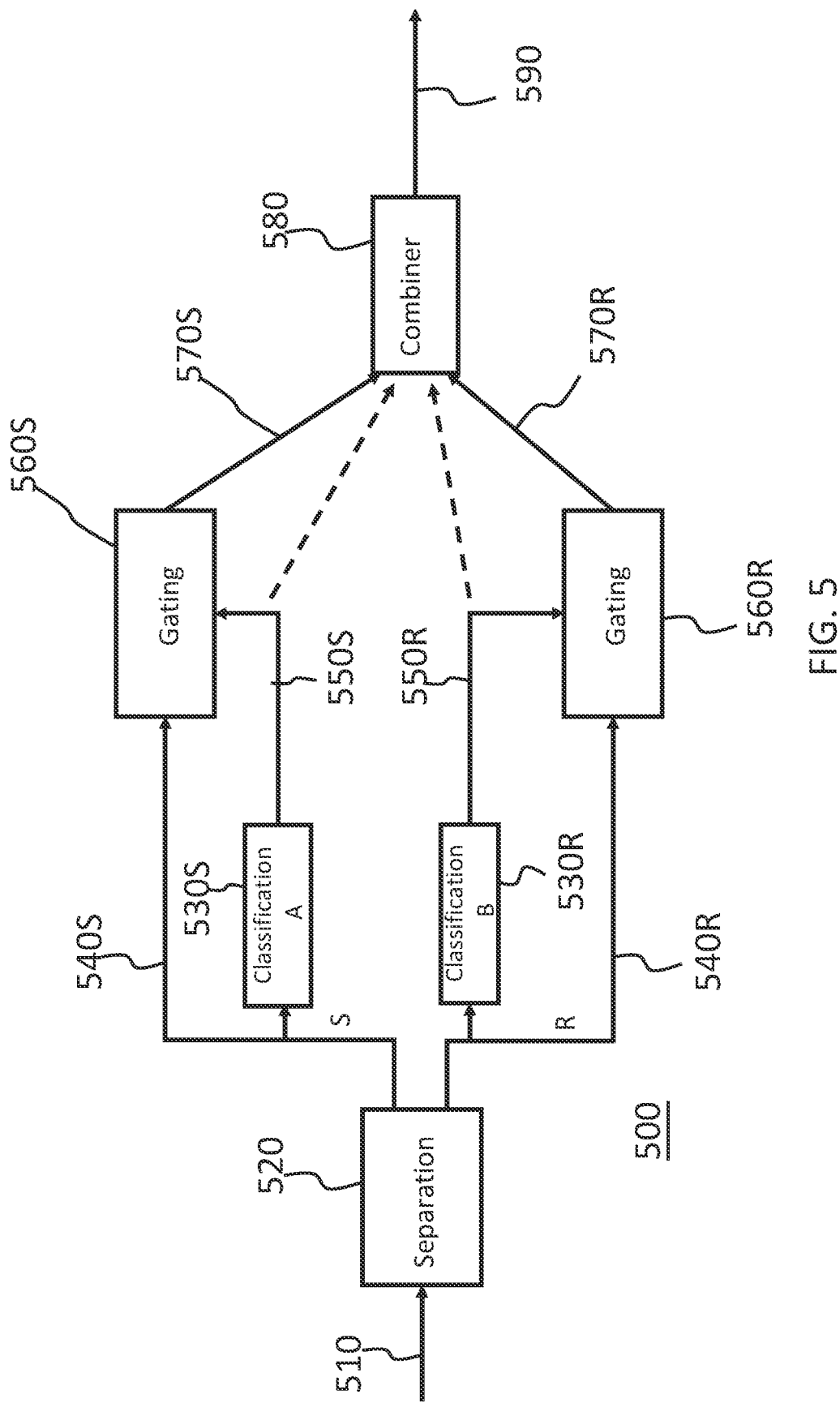
FIG. 5 shows a separation and classification system of both the extracted signal and the residual.

The system (500) shown in the embodiment of FIG. 5 allows explicit classification (530R, 530S) and gating (560R, 560S) of the residual (bottom section of FIG. 5) as well as the extracted signal (top section of FIG. 5). The combiner (580) then can simply add the two estimated qualified signals (570R, 570S) together to produce a qualified estimate (590), or perform some optional combination based on the outputs (550R, 550S) of the classifiers (530R, 530S), shown in FIG. 5 by way of broken lines. The system of FIG. 5 is similar to the system of FIG. 4 with the ability to mitigate cases where the separator (520) fails, in which situation the system can output (590) a gated separated residual (570R) rather than the entire original mix (570S).

Figure 6:
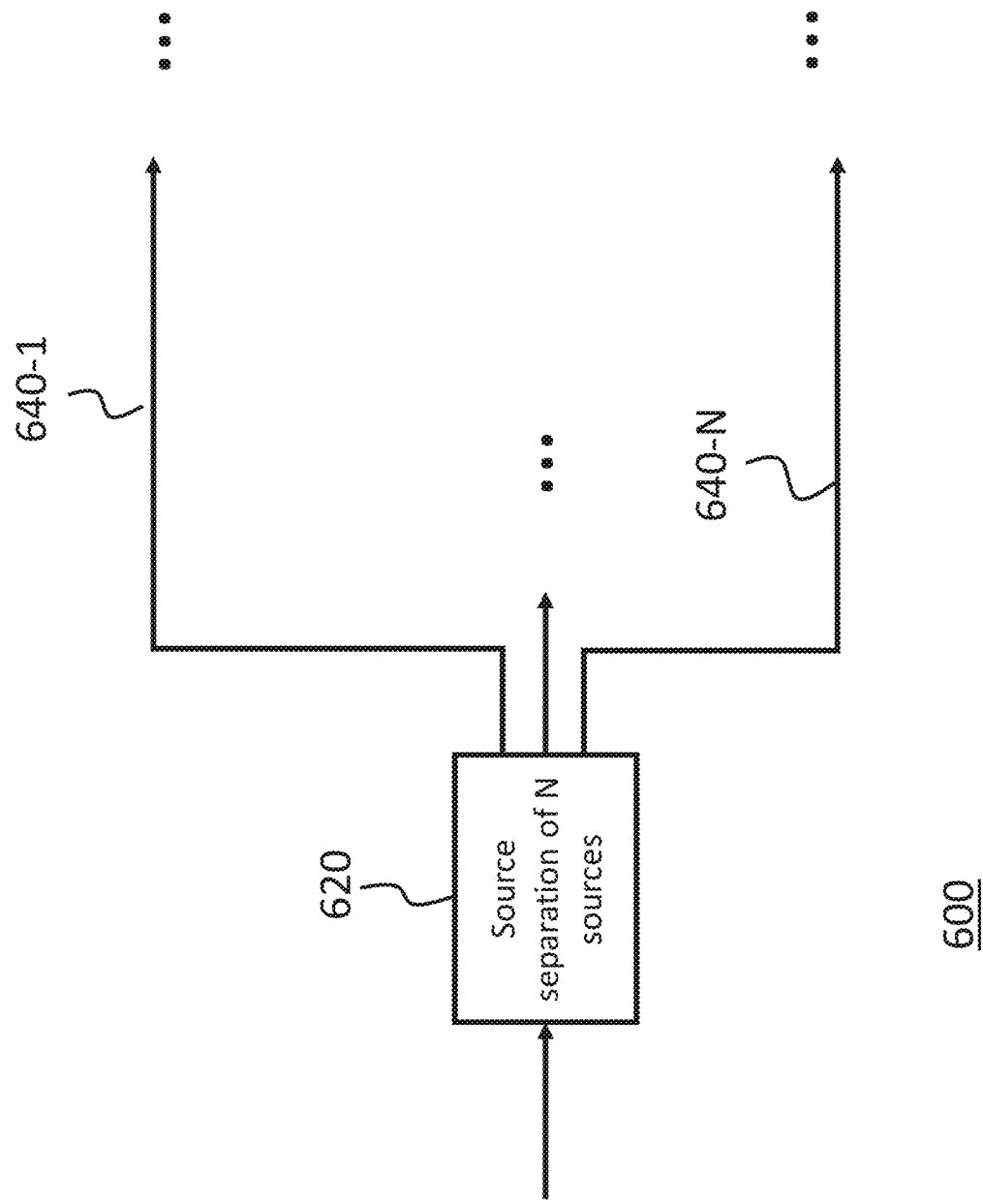
FIG. 6 shows a separator for extraction of multiple sources and later independent processing according any one of the systems of FIGS. 2-5.

FIG. 6 shows a further embodiment (600) of the present disclosure, where a separator (620) extracts multiple sources (640-1, ..., 640-N) that are later independently processed according to any one of the embodiments shown in FIGS. 2-5.

Table 1 below provides a description of the latency and processing times/costs involved by the several embodiments according to the disclosure. Latency and processing costs for the separator(s) and classifier(s) will considered to be substantial, while other latency and processing costs (such as adding or combining data) will considered to be insignificant. The soft gating operation is assumed to incur relatively insignificant computation and no latency, except as described above (where lookahead could be chosen if it improved classification performance).

With reference to Table 1 below, variables indicating latency begin with the letter "L" and variables indicating processing cost begin with the letter "P. The second letter of a variable name indicates whether it refers to separation ("S") or classification ("C") In some cases, there are two classifiers or separators pertaining to the same target source or input mixture, which are indicated by inclusions of the letters "A" or "B." In some cases there are multiple sources, which are indicated by the number "1" for the first source or "N" for the last source. In a series of items, the ellipsis indicates that additional similar items may exist. For example, we may specify a series of N=4 items as 1, ..., N as shorthand for 1,2,3,4. The same notation applies if there were 3 sources, 20 sources, or some other number. And if N=1, then the ellipsis and Nth source quantities may be ignored.

TABLE 1

| Architecture | How input processed | Latency | Processing (Computation) |
|---|---|---|---|
| FIG. 2 | Classified then separated | Max(LS, LC) | PS + PC |
| FIG. 3 | "Separated + Mix" Classified | LS + LC | PS + PC |
| FIG. 4 | Separated and Mix Each Classified and combined | Max(LCA, LS + LCB) | PS + PCA + PCB |
| FIG. 5 | Separated into target and residual, each of which is classified | LS + Max(LCA, LCB) | PS + PCA + PCB |
| FIG. 6 | Multi-separator first | LS + Max(LC1, ..., LCN) | PS1 + ... + PSN + PC1 + ... + PCN |
| FIG. 6 + FIG. 3 | "Each separated + Mix" Classified | LS + Max(LC1, ..., LCN) | PS1 + ... + PSN + PC1 + ... + PCN |
| FIG. 6 + FIG. 4 | Each separated and mix classified and combined | Max (LC, LS + LC1, ..., LS + LCN) | PS1 + ... + PSN + PC + PC1 + ... + PCN |

The calculations of Table 1 can provide valuable help to the person skilled in the art in order to decide which is the best implementation of the systems discussed so far in terms of the specific use desired.

Figure 7:
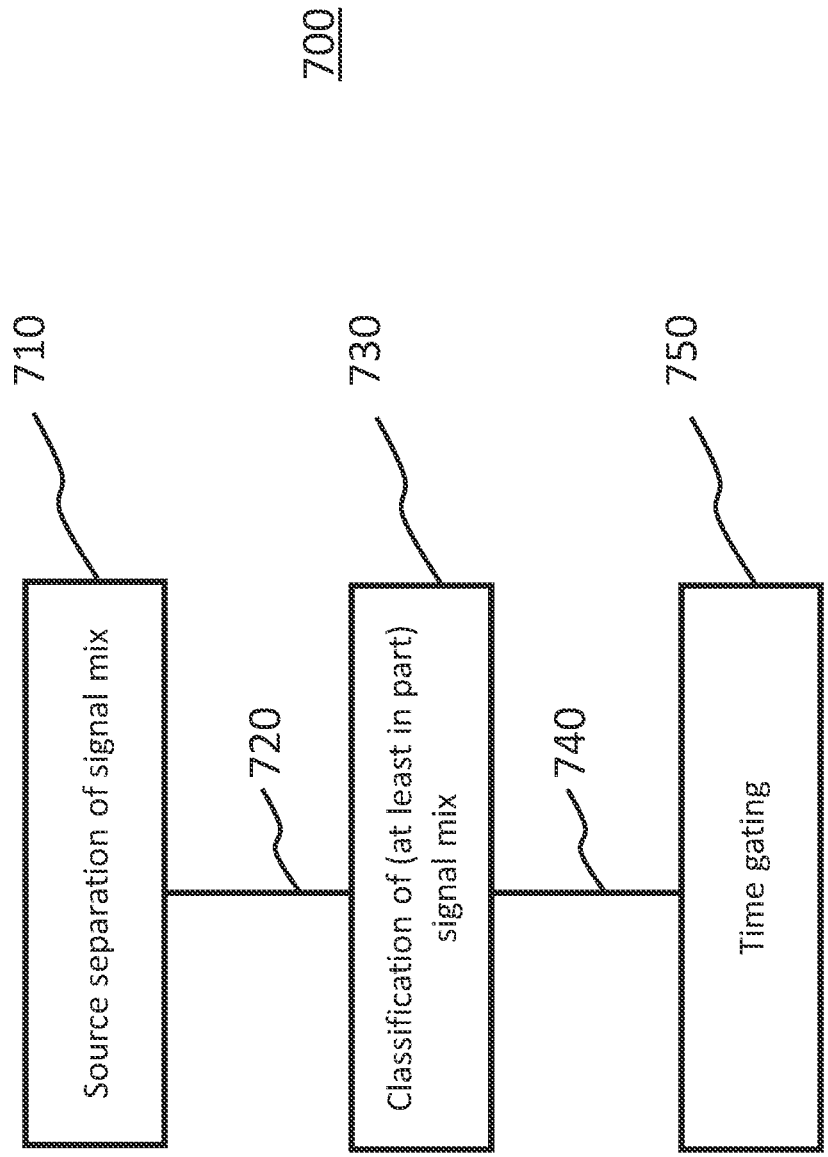
FIGS. 7 and 8 show flowcharts according to embodiments of the methods of the present disclosure.

FIG. 7 shows a schematic flowchart (700) of an audio processing method generally implemented according to the teachings of FIGS. 2-4. Source separation (710) is performed on a mixture of audio signals to obtain at least one estimated separated audio signal (720) indicative of a target audio source or sources. Audio classification (730) is performed on, at least in part, the mixture of audio signals to obtain a determination (740) whether the mixture of audio signals contains the target audio source or sources. Time gating (750) is performed on the separated audio signal based on at least the determination.

Figure 8:
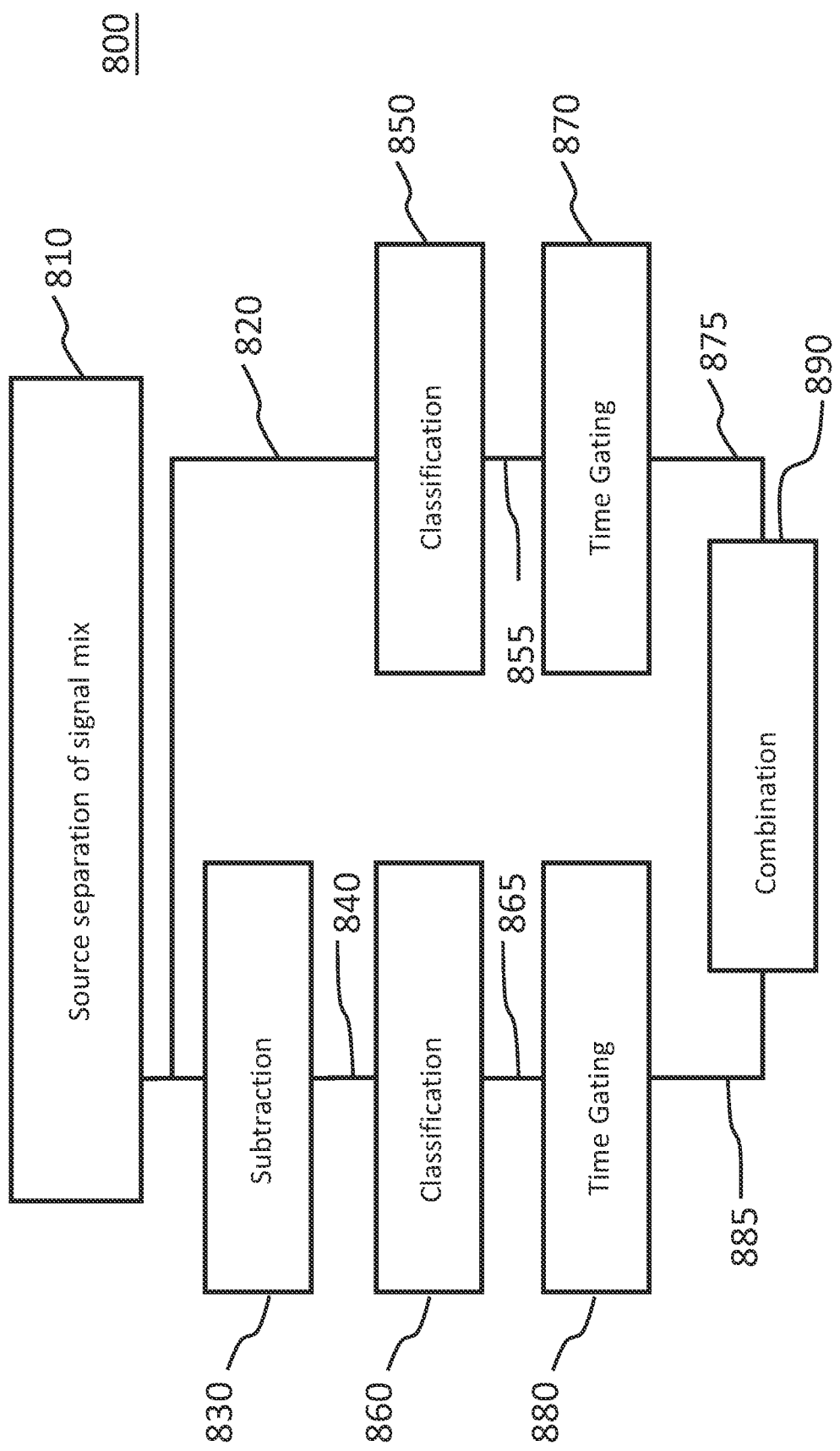

FIG. 8 shows a schematic flowchart (800) of an audio processing method generally implemented according to the teachings of FIG. 5. Source separation (810) is performed on a mixture of audio signals to obtain at least one estimated separated audio signal (820) indicative of a target audio source or sources. The estimated separated audio signal is subtracted (830) from the mixture of audio signals to obtain a residual audio signal (840). Audio classification (850) is performed on the estimated separated audio signal to obtain a signal determination (855) whether the estimated separated audio signal (contains the target audio source or sources. Audio classification (860) is also performed on the residual audio signal to obtain a residual determination (865) whether the residual audio signal contains the target audio source or sources. Time gating (870) is performed on the separated audio signal based on the signal determination to obtain a time gated estimated separated audio signal (875). Time gating (880) is also performed on the residual audio signal based on the residual determination to obtain a time gated residual audio signal (885). The time gated residual audio signal is then combined (890) with the time gated estimated separated audio signal.

The methods and devices according to the present disclosure are to be considered implementation-agnostic, meaning that they can be fully contained and performed in an audio encoder or audio decoder, or that part of them can be contained or performed in an audio encoder and a remaining part of them can be contained or performed in an audio decoder.

The embodiments and teachings disclosed herein may be applied to other implementations without departing from the scope of the present disclosure.

Various aspects of the present invention may be appreciated from the following enumerated example embodiments (EEEs):

EEE 1. A computer-implemented audio separation and classification method comprising:
- performing source separation on a mixture of audio signals to obtain at least one estimated separated audio signal indicative of a target audio source or sources;
- performing audio classification on, at least in part, the mixture of audio signals to obtain a determination whether the mixture of audio signals contains the target audio source or sources; and
- time gating the separated audio signal based on at least the determination.

EEE 2. The method of EEE 1, wherein the audio classification (230) is performed only on the mixture of audio signals (210) and the time gating (260) is based only on the determination (250).

EEE 3. The method of EEE 1, wherein
- the audio classification is performed on a linear combination (325) of the mixture of audio signals (310) and the estimated separated audio signal (320); and
- the time gating is based only on the determination.

EEE 4. The method of EEE 1, the determination being a first determination, the method further comprising:
- performing audio classification (430B) of the estimated separated audio signal (440) to obtain a second determination of the estimated separated audio signal (440) being the target audio source or sources,
- wherein the time gating is based on a combination (435) of the first determination and the second determination.

EEE 5. The method of any one of EEEs 1-4, wherein the time gating fully passes or fully suppresses the estimated separated audio signal based on the determination.

EEE 6. The method of any one of EEEs 1-4, wherein the time gating reduces (130) the estimated separated audio signal to a nonzero value in case of the determination returning a result of the mixture of audio signals not containing the target audio source or sources.

EEE 7. The method of any one of EEEs 1-6, wherein audio classification is performed before audio source separation.

EEE 8. The method of any one of EEEs 1-6, wherein audio classification is performed at the same time as audio source separation.

EEE 9. The method of any one of EEEs 1-9, wherein source separation is tuned for known attributes of the target audio source.

EEE 10. A computer-implemented audio separation and classification method comprising:
- performing source separation (520) on a mixture of audio signals (510) to obtain at least one estimated separated audio signal (540S) indicative of a target audio source or sources;
- subtracting the estimated separated audio signal (540S) from the mixture of audio signals (510) to obtain a residual audio signal (540R);
- performing audio classification (530S) on the estimated separated audio signal (540S) to obtain a signal determination (550S) whether the estimated separated audio signal (540S) contains the target audio source or sources;
- performing audio classification (530R) on the residual audio signal (540R) to obtain a residual determination (550R) whether the residual audio signal (540R) contains the target audio source or sources;
- time gating (560S) the separated audio signal (540S) based on the signal determination (550S) to obtain a time gated estimated separated audio signal (570S);
- time gating (560R) the residual audio signal (540R) based on the residual determination (550R) to obtain a time gated residual audio signal (570R); and
- combining (580) the time gated residual audio signal (570R) with the time gated estimated separated audio signal (570S).

EEE 11. The method of any one of EEEs 1-10, performed in one of: an audio encoder, an audio decoder, or partly in an audio encoder and partly in an audio decoder.

EEE 12. The method of any one of EEEs 1-11 where performing separation is to obtain a plurality of estimated separated audio signals, on each of which the time gating based on at least the determination is independently performed.

EEE 13. A non-transitory medium comprising computer readable program code configured to perform steps according to the method of any of EEEs 1-12 when running on a computer.

EEE 14. An apparatus for audio separation and classification, comprising:
- a source separator, configured to separate a mixture of audio signals to obtain an estimated separated audio signal indicative of a target audio source or sources;
- an audio classifier, configured to perform classification on, at least in part, the mixture of audio signals to obtain a determination whether the mixture of audio signals contains the target audio source or sources; and
- a gating device, configured to time gate the separated audio signal based on at least the determination.

EEE 15. An apparatus for audio separation and classification, comprising:
- a source separator (520), configured to separate a mixture of audio signals (510) to obtain an estimated separated audio signal (540S) indicative of a target audio source or sources;
- a subtractor, configured to subtract the estimated separated audio signal (540S) from the mixture of audio signals (510) to obtain a residual audio signal (540R);
- a signal audio classifier (530S), configured to perform audio classification on the estimated separated audio signal (540S) to obtain a signal determination (550S) whether the estimated separated audio signal (540S) contains the target audio source or sources;
- a residual audio classifier (530R), configured to perform audio classification (530R) on the residual audio signal (540R) to obtain a residual determination (550R) whether the residual audio signal (540R) contains the target audio source or sources;
- a signal gating device (560S), configured to time gate (560S) the separated audio signal (540S) based on the signal determination (550S) to provide a time gated estimated separated audio signal (570S);

a residual gating device (560R), configured to time gate the residual audio signal (540R) based on the residual determination (550R) to provide a time gated residual audio signal (570R); and a combiner (580), configured to combine the time gated residual audio signal (570R) with the time gated estimated separated audio signal (570S).

The invention claimed is:

1. A computer-implemented audio separation and classification method comprising:

performing source separation on a mixture of audio signals to obtain at least one separated audio signal containing a target audio source or sources;

performing audio classification on a linear combination of the mixture of audio signals and the separated audio signal to obtain a determination whether the mixture of audio signals contains the target audio source or sources; and time gating the separated audio signal based on at least the determination.

2. The method of claim 1, wherein the time gating fully passes or fully suppresses the separated audio signal based on the determination.

3. The method of claim 1, wherein the time gating reduces the separated audio signal to a nonzero value in case of the determination returning a result of the mixture of audio signals not containing the target audio source or sources.

4. The method of claim 1, wherein audio classification is performed before audio source separation.

5. The method of claim 1, wherein audio classification is performed at a same time as audio source separation.

6. The method of claim 1, wherein source separation is tuned for known attributes of the target audio source.

7. A computer-implemented audio separation and classification method comprising:

performing source separation on a mixture of audio signals to obtain at least one separated audio signal indicative of a target audio source or sources;

subtracting the separated audio signal from the mixture of audio signals to obtain a residual audio signal;

performing audio classification on the separated audio signal to obtain a signal determination whether the separated audio signal contains the target audio source or sources;

performing audio classification on the residual audio signal to obtain a residual determination whether the residual audio signal contains the target audio source or sources;

time gating the separated audio signal based on the signal determination to obtain a time gated separated audio signal;

time gating the residual audio signal based on the residual determination to obtain a time gated residual audio signal; and combining the time gated residual audio signal with the time gated separated audio signal.

8. The method of claim 1, performed in one of: an audio encoder, an audio decoder, or partly in an audio encoder and partly in an audio decoder.

9. The method of claim 1 where performing separation is to obtain a plurality of separated audio signals, on each of which the time gating based on at least the determination is independently performed.

10. A non-transitory medium comprising computer readable program code configured to perform steps according to the method of claim 1 when running on a computer.

11. An apparatus for audio separation and classification, comprising:

a source separator, configured to separate a mixture of audio signals to obtain a separated audio signal indicative of a target audio source or sources;

an audio classifier, configured to perform classification on, at least in part, the mixture of audio signals to obtain a first determination whether the mixture of audio signals contains the target audio source or sources and a second determination of the separated audio signal being the target audio source or sources; and a gating device, configured to time gate the separated audio signal based on at least a combination of the first determination and the second determination.

12. An apparatus for audio separation and classification, comprising:

a source separator, configured to separate a mixture of audio signals to obtain a separated audio signal indicative of a target audio source or sources;

a subtractor, configured to subtract the separated audio signal from the mixture of audio signals to obtain a residual audio signal;

a signal audio classifier, configured to perform audio classification on the separated audio signal to obtain a signal determination whether the separated audio signal contains the target audio source or sources;

a residual audio classifier, configured to perform audio classification on the residual audio signal to obtain a residual determination whether the residual audio signal contains the target audio source or sources;

a signal gating device, configured to time gate the separated audio signal based on the signal determination to provide a time gated separated audio signal;

a residual gating device, configured to time gate the residual audio signal based on the residual determination to provide a time gated residual audio signal; and a combiner, configured to combine the time gated residual audio signal with the time gated separated audio signal.

13. The method of claim 7, performed in one of: an audio encoder, an audio decoder, or partly in an audio encoder and partly in an audio decoder.

14. The method of claim 7 where performing separation is to obtain a plurality of separated audio signals, on each of which the time gating based on at least the determination is independently performed.

15. A non-transitory medium comprising computer readable program code configured to perform steps according to the method of claim 7 when running on a computer.

* * * * *